(12) United States Patent
Klaiman et al.

(10) Patent No.: US 12,437,571 B2
(45) Date of Patent: Oct. 7, 2025

(54) DOCUMENT INFORMATION EXTRACTION WITHOUT ADDITIONAL ANNOTATIONS

(71) Applicant: SAP SE, Walldorf (DE)

(72) Inventors: Shachar Klaiman, Heidelberg (DE); Marius Lehne, Berlin (DE)

(73) Assignee: SAP SE, Walldorf (DE)

( * ) Notice: Subject to any disclaimer, the term of this patent is extended or adjusted under 35 U.S.C. 154(b) by 1067 days.

(21) Appl. No.: 17/077,568

(22) Filed: Oct. 22, 2020

(65) Prior Publication Data

US 2022/0129671 A1    Apr. 28, 2022

(51) Int. Cl.
| | |
|---|---|
| *G06V 30/414* | (2022.01) |
| *G06F 18/21* | (2023.01) |
| *G06F 18/25* | (2023.01) |
| *G06N 3/045* | (2023.01) |
| *G06N 3/08* | (2023.01) |
| *G06V 30/10* | (2022.01) |

(52) U.S. Cl.
CPC .......... *G06V 30/414* (2022.01); *G06F 18/217* (2023.01); *G06F 18/251* (2023.01); *G06N 3/045* (2023.01); *G06N 3/08* (2013.01); *G06V 30/10* (2022.01)

(58) Field of Classification Search
CPC .... G06F 18/217; G06F 18/251; G06F 18/213; G06V 30/10; G06V 30/414; G06N 3/045; G06N 3/08
See application file for complete search history.

(56) References Cited

U.S. PATENT DOCUMENTS

| | | | |
|---|---|---|---|
| 10,671,878 B1 * | 6/2020 | Sarshogh | G06F 18/217 |
| 11,475,688 B2 * | 10/2022 | Enomoto | G06V 30/416 |
| 11,995,908 B2 * | 5/2024 | Kosaka | G06V 30/416 |

OTHER PUBLICATIONS

Zuo, Ling-Qun, et al. "Natural scene text recognition based on encoder-decoder framework." IEEE Access 7 (Year: 2019).*
Shi, Baoguang, et al. "Aster: An attentional scene text recognizer with flexible rectification." IEEE transactions on pattern analysis and machine intelligence 41.9 (Year: 2018).*

(Continued)

*Primary Examiner* — Schyler S Sanks
*Assistant Examiner* — Adam C Standke
(74) *Attorney, Agent, or Firm* — Sterne, Kessler, Goldstein &Fox P.L.L.C.

(57) ABSTRACT

Disclosed herein are system, method, and computer program product embodiments for document information extraction without additional annotations. An embodiment operates by receiving an input representing a document and a key. The embodiment processes the input using a convolutional neural network to obtain a feature map. The embodiment combines the feature map with positional information to obtain a spatial-aware feature map. The embodiment then repeatedly performs the following decoding process: generate attention weights, generate a context vector based on the spatial-aware feature map and the generated attention weights using an attention layer, process the context vector, the key, and an input vector using a recurrent neural network (RNN) to obtain a RNN state, and generate an output vector (Continued)

based on the RNN state and the context vector using a projection layer. The embodiment then extracts a field based on the result of the decoding process.

20 Claims, 6 Drawing Sheets

(56) References Cited

OTHER PUBLICATIONS

Zhang P et al., TRIE: end-to-end text reading and information extraction for document understanding. In Proceedings of the 28th ACM International Conference on Multimedia Oct. 12 (Year: 2020).*

Clément Sage et al., End-to-End Extraction of Structured Information from Business Documents with Pointer-Generator Networks. EMNLP 2020 Workshop on Structured Prediction for NLP, Nov. 2020, Punta Cana Dominican Republic(online on HAL on 6 Oct) ( Year: 2020).*

Denk, Timo I., Supervisors Dr Christian Reisswig, and PD Dr Markus Reischl. "Wordgrid: Extending Chargrid with Word-level Information." (Year: 2019).*

Zuo, Ling-Oun, et al. "Natural scene text recognition based on encoder-decoder framework." IEEE Access 7 (Year: 2019).*

Shi, Baoguang, et al. "Aster: An attentional scene text recognizer with flexible rectification." IEEE transactions on pattern analysis and machine intelligence 41.9 (Year: 2019).*

Liu, Wei, et al., "SAFE: scale aware feature encoder for scene text recognition." Computer Vision—ACCV 2018: 14th Asian Conference on Computer Vision, Perth, Australia, Dec. 2-6, 2018, Revised Selected Papers, Part II 14. Springer International Publishing (Year: 2019).*

Wojna, Zbigniew, et al. "Attention-based extraction of structured information from street view imagery." 2017 14th IAPR international conference on document analysis and recognition (ICDAR). vol. 1. IEEE (Year: 2017).*

Bahdanau, D. et al., "Neural Machine Translation by Jointly Learning to Align and Translate," Published as a conference paper at ICLR 2015, 15 pages, retrieved from https://arxiv.org/pdf/1409.0473.pdf, May 19, 2016.

Hochreiter, S. and Schmidhuber, J., "Long Short-Term Memory," Neural Computation 9(8), pp. 1735-1780, 1997.

Katti, A. R. et al., "Chargrid: Towards Understanding 2D Documents," Published as a conference paper at EMNLP 2018, 11 pages, retrieved from https://arxiv.org/pdf/1809.08799.pdf, Sep. 24, 2018.

Reisswig, C. et al., "Chargrid-OCR: End-to-end Trainable Optical Character Recognition for Printed Documents using Instance Segmentation," 10 pages, retrieved from https://arxiv.org/pdf/1909.04469.pdf, Feb. 27, 2020.

Sutskever, I. et al., :"Sequence to Sequence Learning with Neural Networks," Advances in Neural Information Processing Systems 27, 9 pages, 2014.

Vaswani, A. et al., "Attention Is All You Need," 31st Conference on Neural Information Processing Systems (NIPS 2017), 11 pages, 2017.

Wojna, Z. et al., "Attention-based Extraction of Structured Information from Street View Imagery," 14th IAPR International Conference on Document Analysis and Recognition (ICDAR), 7 pages, retrieved from https://arxiv.org/pdf/1704.03549.pdf, Aug. 20, 2017.

* cited by examiner

DOCUMENT INFORMATION EXTRACTION WITHOUT ADDITIONAL ANNOTATIONS

BACKGROUND

Document information extraction involves extracting fields in a document. For example, document information extraction may involve extracting an invoice number and a total amount from an invoice document. Document information extraction systems may use deep-learning (DL) to automate the document information extraction process. These DL systems often need to be trained before they can perform document information extraction.

Training these DL systems often requires a user to annotate large numbers of documents of a particular type (e.g., invoice documents). More specifically, a user often needs to identify and label fields in sample documents together with the coordinates of a rectangle surrounding the respective field in the document. But these DL systems often suffer from significant technological problems.

First, these DL systems require the user to complete a lengthy annotation process before they can be used to extract fields from a document. Second, training these DL systems often takes significant time because the user may have annotated the wrong sample documents. Third, these DL systems often rely on additional models to perform extraction for certain types of documents. This is because these DL systems often depend on a pre-existing optical character recognition (OCR) system that is able to recognize fields in a particular language or format. Finally, these DL systems often fail to accurately extract fields because they are dependent on the performance of a pre-existing OCR system.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
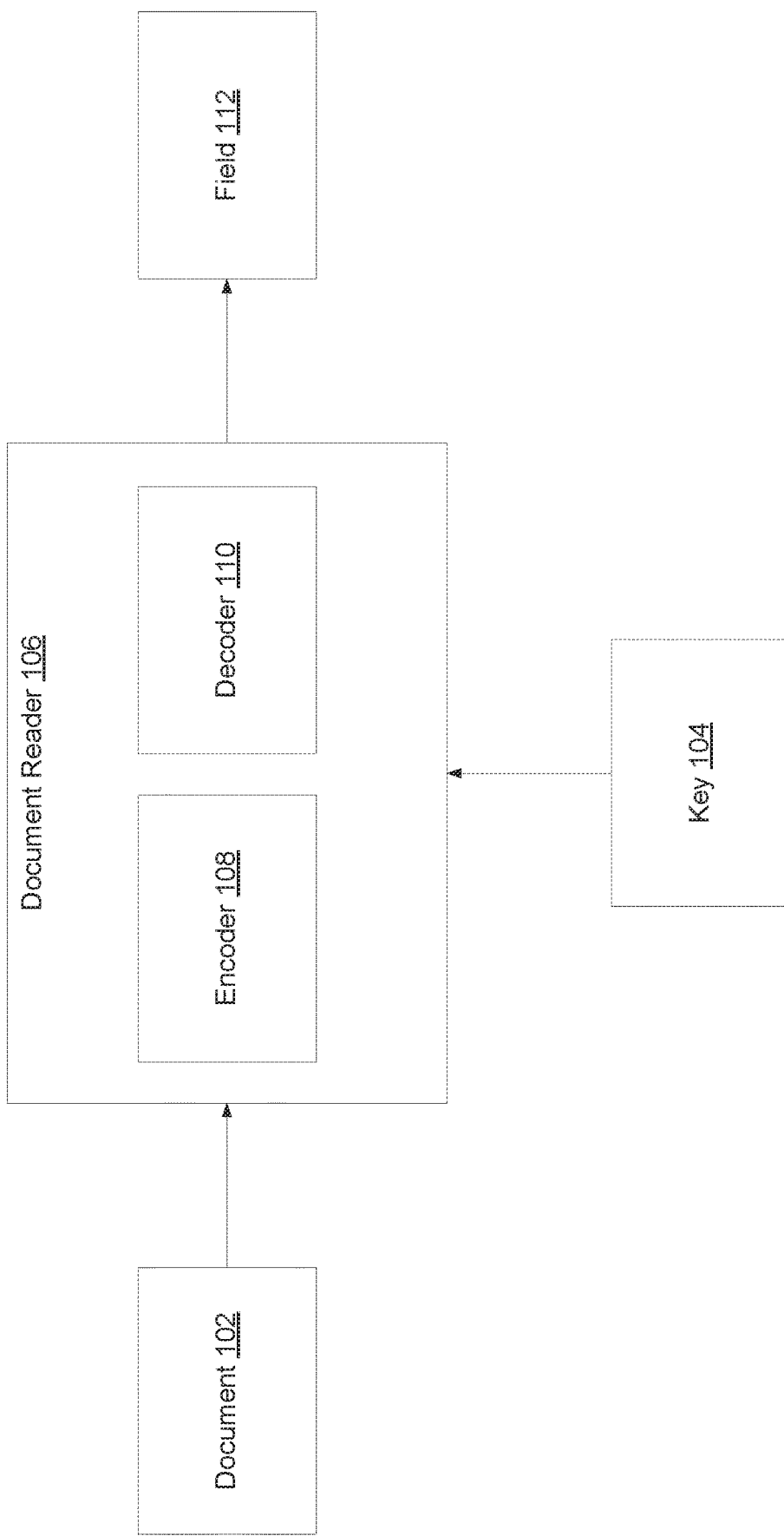
FIG. 1 is a block diagram of a document reader that performs field extraction from a document, according to some embodiments.

Provided herein are system, apparatus, device, method and/or computer program product embodiments, and/or combinations and sub-combinations thereof, for performing document information extraction without additional annotations. An embodiment operates by receiving an input representing a document (e.g., an invoice document) and a key representing a field to extract from the document (e.g., a total amount). The embodiment uses a convolutional neural network (CNN) to obtain a feature map for the input. The embodiment combines the feature map with positional information for each feature in the feature map to obtain a spatial-aware feature map. The embodiment then repeatedly performs a decoding step yielding a single token until the token corresponds to an end token. The embodiment then extracts the field based on a list of output vectors produced during the decoding process.

In an embodiment, the decoding step first generates a set of attention weights for an attention layer based on the spatial-aware feature map, the key, a previous recurrent neural network (RNN) state associated with a RNN, a previous set of attention weights for the attention layer, and a previous output vector. The decoding step then generates a context vector based on the spatial-aware feature map and the generated set of attention weights using the attention layer. The decoding step then processes the context vector, the key, and an input vector using the RNN to obtain a new RNN state associated with the RNN. The decoding step then generates an output vector based on the new RNN state and the context vector using a projection layer. The decoding step then stores the generated output vector in a list of output vectors. Finally, the decoding step is repeated with the generated set of attention weights being the previous set of attention weights, the new RNN state being the previous RNN state, the generated output vector being the previous output vector, and the generated output vector being the input vector until the generated output vector corresponds to an end token.

An embodiment can solve at least two technological problems. First, the embodiment can eliminate the need to annotate data with spatial information (e.g., bounding boxes), or annotate on top of existing historical data, as part of the document information extraction training process. This is because the embodiment uses an encoder-decoder pattern that enables end-to-end training from an input (e.g., an image) to an output field (e.g., a text string). Moreover, this is because the embodiment uses an attention layer in the decoder that is based on the previous RNN state of a RNN in the decoder, the previous output vector (e.g., the previously predicted character), and the inputted key. This makes the attention layer recurrent, auto-regressive, and key-conditioned, respectively.

Second, the embodiment can avoid the need to have a well performing OCR system upfront. This can make the embodiment an end-to-end information extraction solution.

FIG. 1 illustrates a document reader 106 that performs field extraction from a document, according to some embodiments. Document reader 106 can be a deep-learning (DL) based system. Document reader 106 can be trained using historically available data (e.g., document images and corresponding extracted text). Document reader 106 can be trained without needing to annotate the training data (e.g., the document images). This can reduce the cost and time delay associated with training. Document reader 106 includes encoder 108 and decoder 110.

Document reader 106 can operate in inference mode or training mode. In interference mode, document reader 106 can receive a document 102 and a key 104. Document 102 can represent a document for field extraction. Document 102 can be stored in bitmap (BMP) format, Joint Photographic Experts Group (JPEG) format, Portable Network Graphics (PNG) format, or various other image formats as would be appreciated by a person of ordinary skill in the art. Document 102 can also be stored in a semi-structured file format such as, but not limited to, Extensible Markup Language (XML) or JavaScript Object Notation (JSON). Key 104 can represent a field to extract from document 102.

Document reader 106 can process document 102 using encoder 108. Encoder 108 can generate a feature map for document 102. A feature map can also be referred to as a memory. The feature map can be a dense intermediate representation of document 102. Document reader 106 can combine the feature map with positional information for each of the features of the feature map to obtain a spatial-aware feature map. Encoder 108 can output the spatial-aware feature map and the key to decoder 110. Decoder 110 can then process the spatial-aware feature map and the key to predict a field 112 in document 102 corresponding to key 104.

Figure 2:
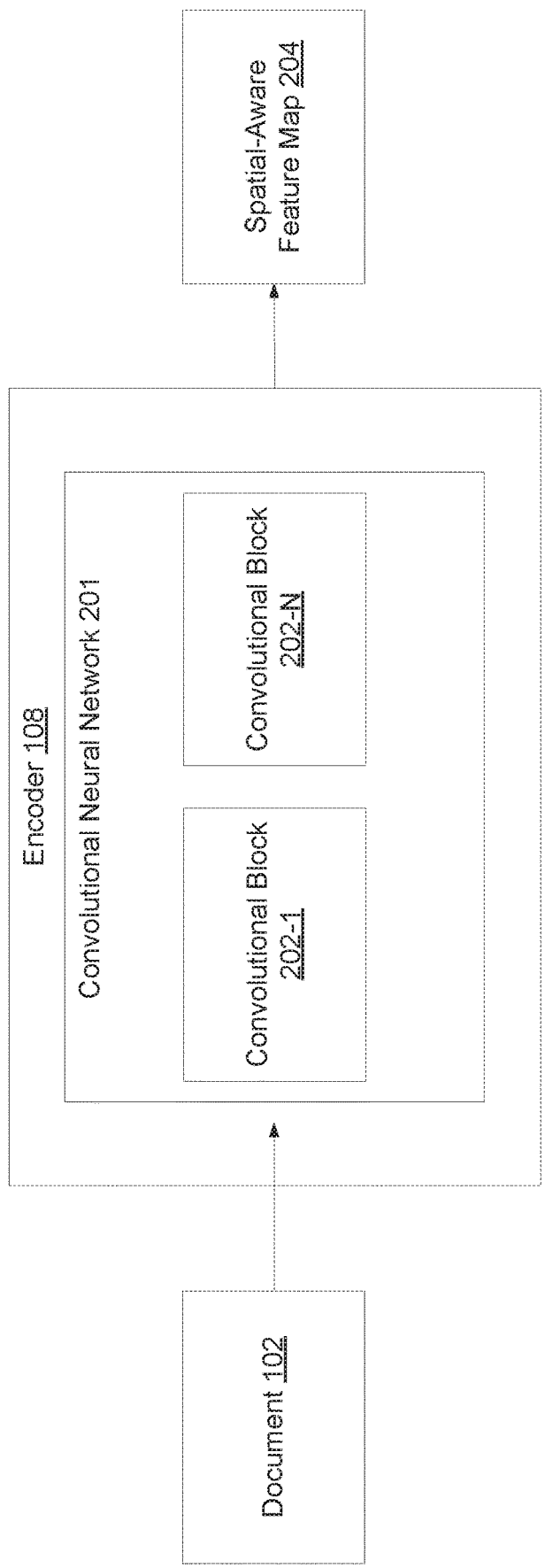
FIG. 2 is a block diagram of an encoder of the document reader of FIG. 1, according to some embodiments.

FIG. 2 illustrates encoder 108 of document reader 106, according to some embodiments. FIG. 2 is discussed with reference to FIG. 1. Encoder 108 can include a convolutional neural network (CNN) 201. CNN 201 can include one or more convolutional blocks 202. Each convolutional block 202 can include one or more convolutional layers. Each convolutional block 202 can include a batch-normalization layer after the one or more convolutional layers. Each convolutional block 202 can also include a dropout layer after the one or more convolutional layers.

Encoder 108 can receive document 102. Encoder 108 can process document 102 using CNN 201 to obtain a feature map for document 102. The feature map can be a dense intermediate representation of document 102.

Encoder 108 can combine the feature map with positional information for each feature in the feature map to obtain a spatial-aware feature map 204. In some embodiments, encoder 108 can generate the positional information for each feature in feature map as a set of one-hot vectors. For example, encoder 108 can represent a position of a feature in the feature map as two vectors: an x-vector and a y-vector. The x-vector can be the length of the x-axis of the feature map. The y-vector can be the length of the y-axis of the feature map. For a given feature, encoder 108 can assign a one to the element of the x-vector corresponding to the position of the feature along the x-axis of the feature map. Similarly, encoder 108 can assign a one to the element of the y-vector corresponding to the position of the feature along the y-axis of the feature map. Encoder 108 can assign zeros to the other elements of the x-vector and the y-vector.

For each feature in the feature map, encoder 108 can combine the corresponding x-vector and the y-vector together into a single vector. The single vector can be referred to as positional information for the respective feature. For example, for each feature in a feature map of 80×104, encoder 108 can represent the position of the respective feature using a single vector of size 80+104. The set of positional information for the feature map can be referred to as a spatial encoding.

In some other embodiments, encoder 108 can generate the positional information for each feature in the feature map as a corresponding vector of scalar values. For example, encoder 108 can represent a position of a feature in the feature map as a vector of two scalar values: an x-value and a y-value. For a given feature, encoder 108 can assign the position of the feature along the x-axis of the feature map to the x-value of the vector. Similarly, encoder 108 can assign the position of the feature along the y-axis of the feature map to the y-value of the vector. For each feature in the feature map, encoder 108 can store the corresponding vector of scalar values. The vector of scalar values can be referred to as positional information for the respective feature. For example, for each feature in a feature map of 80×104, encoder 108 can represent the position of the respective feature using a vector of two scalar values. The set of positional information for the feature map can be referred to as a spatial encoding.

In some other embodiments, encoder 108 can generate the positional information for each feature in the feature map as a corresponding trainable fixed length vector. To generate the positional information for each feature in the feature map, the respective trainable fixed length vector can be randomly initialized. Document reader 106 can then be trained based on document 102. During training of document reader 106, each trainable fixed length vector corresponding to a feature in the feature map can be trained to include a representation of the position of the respective feature in the feature map. Each trainable fixed length vector can be trained during the end to second stage training process of document reader 106 as discussed below.

Encoder 108 can combine the positional information for the features in the feature map (e.g., the spatial encoding) with the feature map itself thereby generating a spatial-aware feature map 204. For example, encoder 108 can add the positional information along a channel axis of the feature map. Encoder 108 can combine the positional information with the feature map in various other ways as would be appreciated by a person of ordinary skill in the art.

Figure 3:
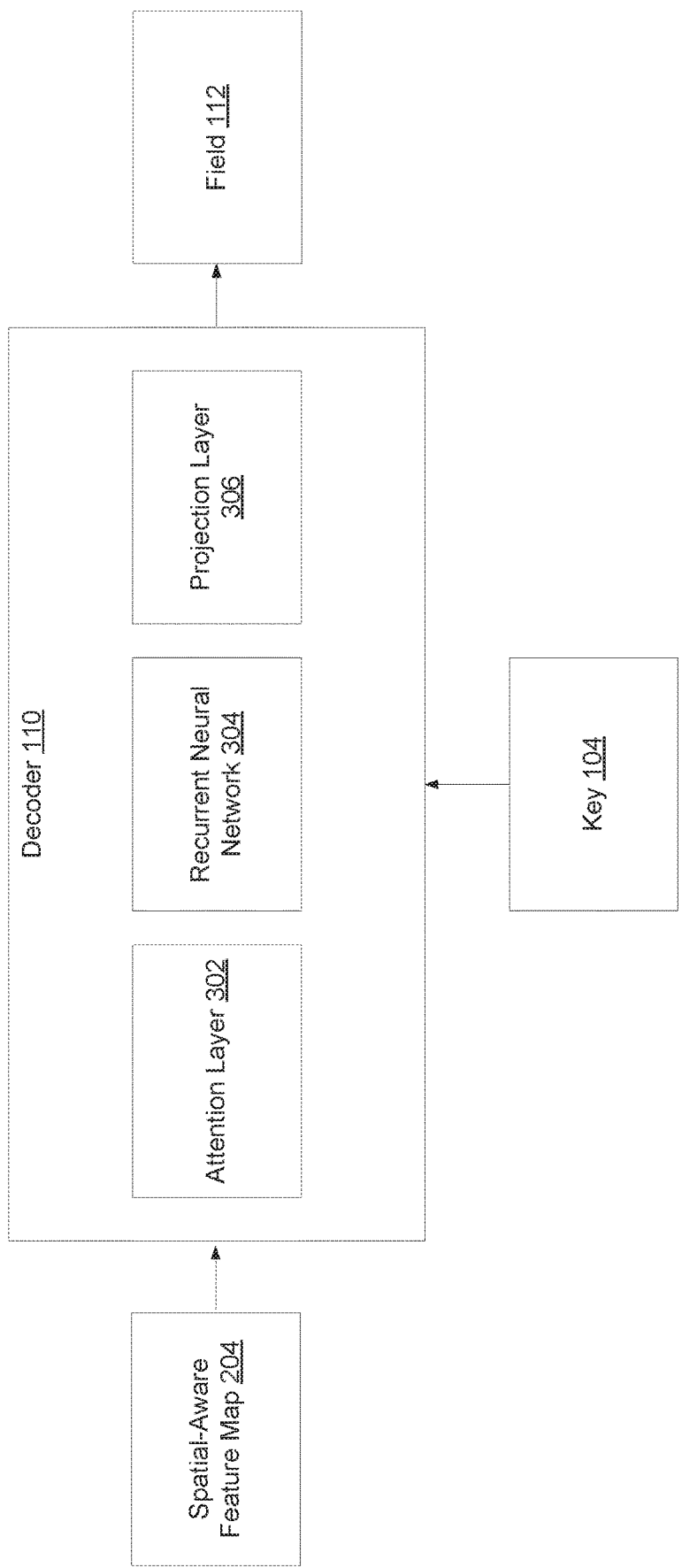
FIG. 3 is a block diagram of a decoder of the document reader of FIG. 1, according to some embodiments.

FIG. 3 illustrates decoder 110, according to some embodiments. FIG. 3 is discussed with reference to FIGS. 1 and 2. Decoder 110 can include an attention layer 302, a recurrent neural network (RNN) 304, and a projection layer 306. Attention layer 302 can be a sum-attention layer. Attention layer 302 can also be various other types of attention layer as would be appreciated by a person of ordinary skill in the art. RNN 304 can be a long short-term memory (LSTM). RNN 304 can also be various other types of RNN as would be appreciated by a person of ordinary skill in the art.

Decoder 110 can receive spatial-aware feature map 204 from encoder 108. Decoder 110 can also receive key 104. Decoder 110 can perform one or more decoding steps (also referred to as time-steps) based on spatial-aware feature map 204 and key 104. Decoder 110 can then output field 112 in document 102 corresponding to key 104.

Decoder 110 can receive key 104 in encoded form. Document reader 106 can encode key 104 using a one-hot vector. Document reader 106 can also encode key 104 through the training of document reader 106. Document reader 106 can also encode key 104 using various other techniques as would be appreciated by a person ordinary skill in the art.

Decoder 110 can process spatial-aware feature map 204 based on key 104 using attention layer 302, RNN 304, and projection layer 306 to obtain field 112. Decoder 110 can process spatial-aware feature map 204 based on key 104 by repeating one or more decoding steps (also referred to as time-steps) until an end token is predicted for field 112. Decoder 110 can then output field 112 in document 102 corresponding to key 104.

Decoder 110 can initialize an input vector $\vec{I}_t$, a set of attention weights $\vec{a}_t$, a RNN state $\vec{h}_t$ associated with RNN 304 (also referred to as a hidden state), and an output vector $\vec{o}_t$ prior to performing the one or more decoding steps. The variable t can represent a decoding step (or time-step) in the decoding process. Thus, during initialization, t can be represented as zero, and decoder 110 can initialize each of the set of attention weights $\vec{a}_o$, the RNN state $\vec{h}_o$, and the output vector $\vec{o}_o$.

In some embodiments, decoder 110 can initialize each of the set of attention weights $\vec{a}_o$, the RNN state $\vec{h}_o$, and the output vector $\vec{o}_o$ to zero. Decoder 110 also initialize the input vector $\vec{I}_o$ to a start token. For example, decoder 110 can initialize the input vector $\vec{I}_o$ to zero, where zero represents the start token.

For each decoding step t, decoder 110 can generate a set of attention weight $\vec{a}_t$ for attention layer 302. In some embodiments, decoder 110 can compute the set of attention weight $\vec{a}_t$ according to the following formula. However, in other embodiments, decoder 110 can compute the set of attention weights $\vec{a}_t$ using other formulas/code/pseudocode/algorithms.

$$f(m, \vec{k}, \vec{a}, \vec{b}, \vec{c}) = \tanh(W_m m + W_k \vec{k} + W_a \vec{a} + W_b \vec{b} + W_c \vec{c})$$

$$\vec{a}_t = \text{softmax}(\vec{v}^1 f(m, \vec{k}, \vec{h}_{t-1}, \vec{o}_{t-1}, \vec{a}_{t-1}))$$

In the above formula, m can represent the spatial-aware feature map 204, k can represent key 104, $\vec{h}_{t-1}$ can represent the RNN state h associated with RNN 304 at decoding step t−1, $\vec{o}_{t-1}$ can represent the output vector o at decoding step t−1, and $\vec{a}_{t-1}$ can represent the set of attentions weights $\vec{a}$ associated with attention layer 302 at decoding step t−1. Thus, for the first decoding step, decoder 110 can compute the set of attention weights $\vec{a}_1$ according to the following formula.

$$\vec{a}_1 = \text{softmax}(\vec{v}^1 f(m, \vec{k}, \vec{h}_o, \vec{o}_o, \vec{a}_o))$$

Attention layer 302 can receive the spatial-aware feature map 204 (e.g., m) and the generated set of attention weights (e.g., $\vec{a}_t$) for attention layer 302. Attention layer 302 can compute a context vector based on the spatial-aware feature map 204 and the generated set of attention weights (e.g., $\vec{a}_t$) for attention layer 302. Attention layer 302 can compute a context vector at time t (e.g., $\vec{c}_t$) according to the following formula. However, in other embodiments, attention layer 302 can compute the context vector at time t (e.g., $\vec{c}_t$) using other formulas/code/pseudocode/algorithms.

$$\vec{c}_t = \sum_n a_m \vec{m}_n$$

In the above formula, m can represent spatial-aware feature map 204 and $\vec{a}_t$ can represent the set of attentions weights $\vec{a}_t$ associated with attention layer 302 at decoding step t.

RNN 304 can receive the computed context vector at time t (e.g., $\vec{c}_t$), the key 104, and the input vector at time t (e.g., $\vec{I}_t$). RNN 304 can receive the concatenation of computed context vector at time t (e.g., $\vec{c}_t$), the key 104, and the input vector at time t (e.g., $\vec{I}_t$). RNN 304 can then process the context vector at time t (e.g., $\vec{c}_t$), the key 104, and the input vector at time t (e.g., $\vec{I}_t$) to obtain the RNN state at time t (e.g., $\vec{h}_t$) for the RNN 304.

Projection layer 306 can receive the RNN state at time t (e.g., $\vec{h}_t$) for the RNN 304 and the context vector at time t (e.g., $\vec{c}_t$). Projection layer 306 can receive the concatenation of the RNN state at time t (e.g., $\vec{h}_t$) for the RNN 304 and the context vector at time t (e.g., $\vec{c}_t$).

In some embodiments, projection layer 306 can be a softmax layer. The softmax layer can be a dense layer with a softmax activation. Projection layer 306 can also be various other types of projection layer as would be appreciated by a person of ordinary skill in the art.

Projection layer 306 can generate the output vector at time t (e.g., $\vec{o}_t$) based on the RNN state at time t (e.g., $\vec{h}_t$) for the RNN 304 and the context vector at time t (e.g., $\vec{c}_t$). The generated output vector at time t (e.g., $\vec{o}_t$) can have the dimensionality of the vocabulary size (e.g., all possible characters that document reader 106 can predict). The generated output vector at time t (e.g., $\vec{o}_t$) can therefore be used to extract the next predicted character for field 112.

For example, projection layer 306 can project the input of the RNN state at time t (e.g., $\vec{h}_t$) for the RNN 304 and the context vector at time t (e.g., $\vec{c}_t$) into projection probabilities over the different characters in the vocabulary.

Decoder 110 can store the generated output vector at time t (e.g., $\vec{o}_t$) in a list of output vectors to later extract field 112.

After projection layer 306 generates the output vector at time t (e.g., $\vec{o}_t$), decoder 110 can determine whether the output vector at time t (e.g., $\vec{o}_t$) corresponds to an end token. If the output vector at time t (e.g., $\vec{o}_t$) does not correspond to the end token, decoder 110 can repeat the above decoding process for the next time-step (e.g., t+1). For the next time-step, the generated set of attention weights $\vec{a}_t$ can be the set of attention weights $\vec{a}_{t-1}$, the RNN state $\vec{h}_t$ can be the RNN state the generated output vector $\vec{o}_t$ can be the output vector $\vec{o}_{t-1}$, and the generated output vector $\vec{o}_t$ can be the input vector $\vec{I}_t$.

If the output vector at time t (e.g., $\vec{o}_t$) does correspond to the end token, decoder 110 can extract field 112. Decoder 110 can extract field 112 from the stored list of output vectors. Field 112 can represent the predicted field in document 102 corresponding to key 104.

Document reader 106 can be trained prior to performing the above inference process. This can involve adjusting various weights of document reader 106 based on a training dataset. For example, document reader 106 can be trained by minimizing the cross-entropy loss over the character sequence predicted by decoder 110 (e.g., field 112).

To reduce the time associated with training document reader 106, encoder 108 can be initialized using a pre-trained optical character recognition (OCR) model. This can involve loading the weights of the pre-trained OCR model into encoder 108. This can enable the feature map produced by encoder 108 (e.g., spatial-aware feature map 204) to be infused with semantic information of the characters of the document previously learned during the OCR pre-training.

Document reader 106 can be trained according to a two-stage process to reduce the time associated with training. To begin, the weights of encoder 108 can be initialized with the weights from an encoder of a pre-trained OCR model. The weights of decoder 110 (e.g., the weights of attention layer 302, RNN 304, and projection layer 306) can be initialized with values sampled from a random distribution.

During the first stage of training, document reader 106 can be trained with the weights of encoder 108 being fixed while the weights of decoder 110 are updated during the training. The first stage of training can continue until there is a detection of an increase in performance of decoder 110 above a threshold value (e.g., greater than zero).

During the second stage, document reader 106 can be trained such that both the weights of encoder 108 and the weights of decoder 110 are updated during the training process. For example, document reader 106 can unfreeze the weights of encoder 108 and train the entire document reader 106 (e.g., updating the weights of encoder 108, attention layer 302, RNN 304, and projection layer 306). The second stage of training can continue until a loss on a validation set stops decreasing.

In some embodiments, decoder 110 can be trained using a teacher forcing technique. In the teacher forcing technique, instead of RNN 304 receiving the input vector $i_t$ representing the character from the last output of the projection layer 306 (e.g., $o_{t-1}$) during decoding step t, RNN 304 can receive the next character in the expected output.

Figure 4:
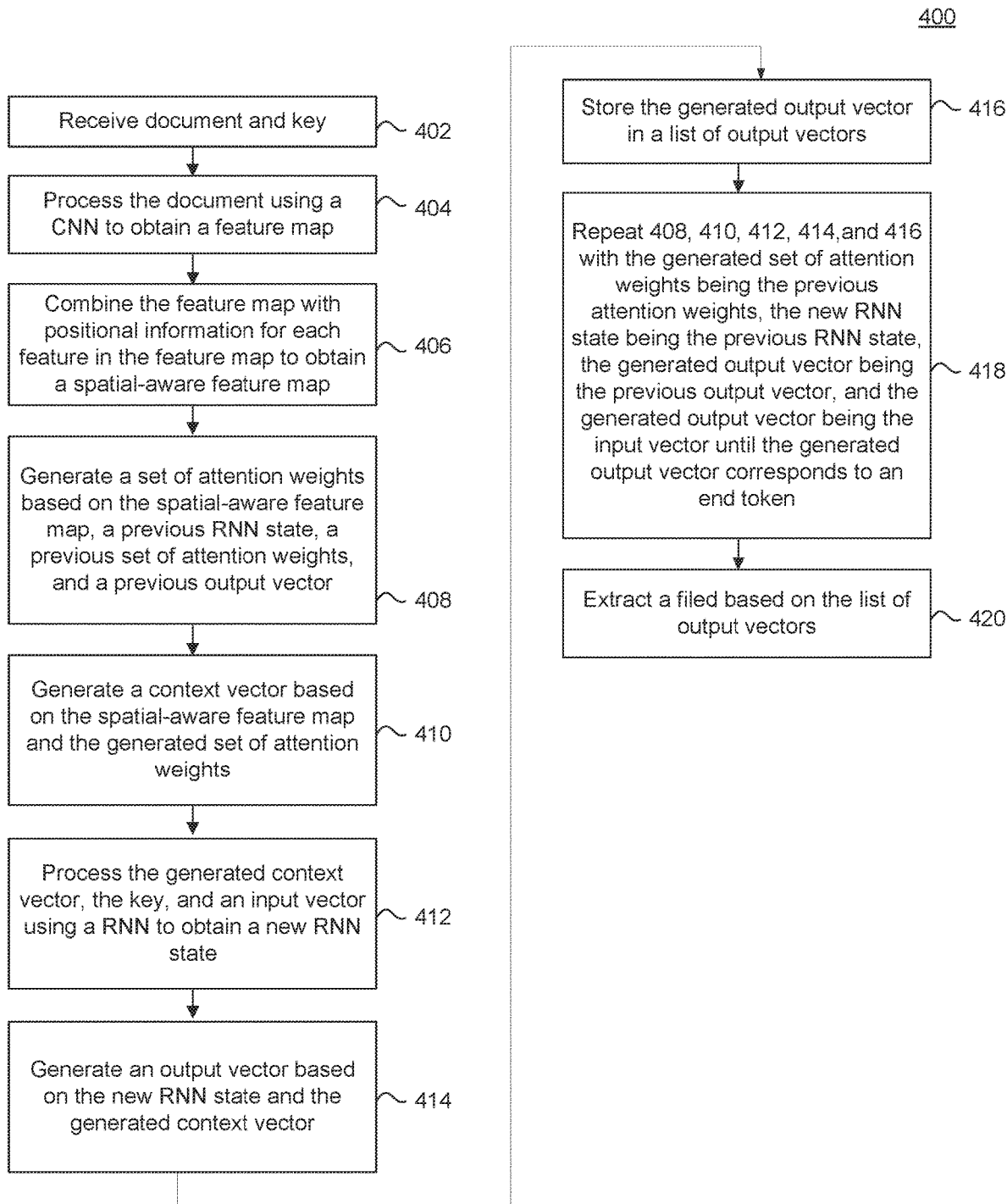
FIG. 4 is a flowchart illustrating a process for performing field extraction from a document, according to some embodiments.

FIG. 4 is a flowchart for a method 400 for performing field extraction from a document, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to that example embodiment.

In 402, document reader 106 receives document 102 and key 104. Document 102 can represent a document for field extraction. Document 102 can be stored in BMP format, JPEG format, PNG format, or various other image formats as would be appreciated by a person of ordinary skill in the art. Document 102 can also be stored in a semi-structured file format such as, but not limited to, XML or JSON. Key 104 can represent a field to extract from document 102.

In 404, encoder 108 processes the document 102 using a CNN to obtain a feature map. The feature map can be a dense intermediate representation of document 102.

In 406, document reader 106 combines the feature map with positional information for each feature in the feature map to obtain spatial-aware feature map 204. In some embodiments, encoder 108 can combine the feature map with positional information for each feature in the feature map to obtain spatial-aware feature map 204. In some other embodiments, another module of document reader 106 can combine the feature map with positional information for each feature in the feature map to obtain spatial-aware feature map 204.

In some embodiments, encoder 108 can generate the positional information for each feature in feature map as a set of one-hot vectors.

In some other embodiments, encoder 108 can generate the positional information for each feature in the feature map as a corresponding vector of scalar values.

In some other embodiments, encoder 108 can generate the positional information for each feature in the feature map as a corresponding trainable fixed length vector. To generate the positional information for each feature in the feature map, the respective trainable fixed length vector can be randomly initialized. Document reader 106 can then be trained based on document 102. During training of document reader 106, each trainable fixed length vector corresponding to a feature in the feature map can be trained include a representation of the position of the respective feature in the feature map. Each trainable fixed length vector can be trained during the end to second stage training process of document reader 106.

In 408, decoder 110 generates a set of attention weights (e.g., $\vec{a}_t$) for attention layer 302 based on spatial-aware feature map 204 (e.g., m), key 104, a previous RNN state associated with RNN 304 (e.g., a previous set of attention weights for the attention layer (e.g., $\vec{a}_{t-1}$), and a previous output vector (e.g., $\vec{o}_{t-1}$).

In some embodiments, 408 is implemented according to the following example formula. However, in other embodiments, 408 can be implemented using other formulas/code/pseudocode/algorithms.

$$f(m,\vec{k},\vec{a},\vec{b},\vec{c}) = \tanh(W_m m + W_k \vec{k} + W_a \vec{a} + W_b \vec{b} + W_c \vec{c})$$

$$\vec{a}_t = \text{softmax}(\vec{v}^t f(m,\vec{k},\vec{h}_{t-1},\vec{o}_{t-1},\vec{a}_{t-1}))$$

In the above formula, t can represent the current decoding step, m can represent spatial-aware feature map 204, k can represent key 104, $\vec{h}_{t-1}$ can represent the RNN state $\vec{h}$ associated with RNN 304 at decoding step t−1, $\vec{o}_{t-1}$ can represent the output vector $\vec{o}$ at decoding step t−1, and $\vec{a}_{t-1}$ can represent the set of attentions weights $\vec{a}$ associated with attention layer 302 at decoding step t−1. Thus, for decoding step 1, decoder 110 can compute the set of attention weights $\vec{a}_t$ as follows:

$$\vec{a}_1 = \text{softmax}(\vec{v}^1 f(m,\vec{k},\vec{h}_0,\vec{o}_0,\vec{a}_0))$$

Prior to performing 408 at the first time-step (e.g., t=1), decoder 110 can initialize an input vector $\vec{i}_t$, the initial set of attention weights (e.g., $\vec{a}_0$), the initial RNN state (e.g., $\vec{h}_0$), and the initial output vector (e.g., $\vec{o}_0$). For example, decoder 110 can initialize each of the initial set of attention weights (e.g., $\vec{a}_0$), the initial RNN state (e.g., $\vec{h}_0$), and the initial output vector (e.g., $\vec{o}_0$) to zero. Decoder 110 also initialize the input vector $\vec{i}_0$ to a start token. For example, decoder 110 can initialize the input vector $\vec{i}_0$ to zero, where zero represents the start token.

In 410, attention layer 302 generates a context vector (e.g., $\vec{c}_t$) based on spatial-aware feature map 204 and the generated set of attention weights $a_t$ associated with attention layer 302 at decoding step t. Attention layer 302 can compute the context vector at time t (e.g., $\vec{c}_t$) according to the following formula. However, in other embodiments, attention layer 302 can compute the context vector at time t (e.g., $\vec{c}_t$) using other formulas/code/pseudocode/algorithms.

$$\vec{c}_t = \sum_n a_m \vec{m}_n$$

In the above formula, m can represent spatial-aware feature map 204 and $\vec{a}_t$ can represent the generated set of attentions weights at associated with attention layer 302 at decoding step t.

In 412, RNN 304 processes the generated context vector (e.g., $\vec{c}_t$), key 104, and an input vector (e.g., $\vec{I}_t$) to obtain a RNN state associated with RNN 304 at decoding step t (e.g., $\vec{h}_t$).

In 414, projection layer 306 generates an output vector (e.g., $\vec{o}_t$) based on the generated RNN state (e.g., $\vec{h}_t$) and the generated context vector (e.g., $\vec{c}_t$).

In 416, decoder 110 stores the generated output vector (e.g., $\vec{o}_t$) in a list of output vectors.

In 418, decoder 110 repeats 408, 410, 412, 414, and 416 with the generated set of attention weights (e.g., $\vec{a}_t$) being the previous set of attention weights (e.g., $\vec{a}_{t-1}$), the obtained RNN state (e.g., $\vec{h}_t$) being the previous RNN state (e.g., $\vec{h}_{t-1}$), the generated output vector (e.g., $\vec{o}_t$) being the previous output vector (e.g., $\vec{o}_{t-1}$), and the generated output vector (e.g., $\vec{o}_t$) being the input vector (e.g., $\vec{I}_t$) until the generated output vector (e.g., $\vec{o}_t$) corresponds to an end token.

In 420, document reader 106 extracts field 112 based on the list of output vectors.

Figure 5:
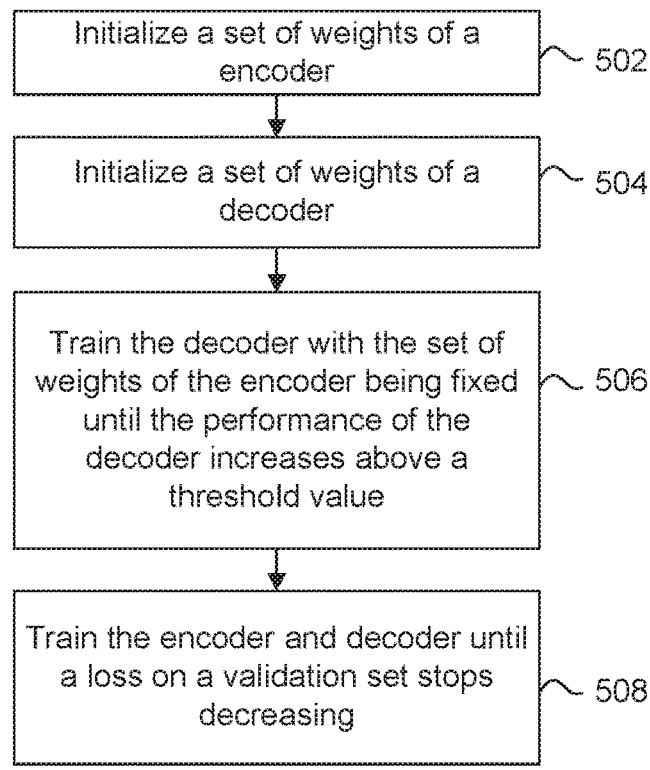
FIG. 5 is a flowchart illustrating a process for training the document reader of FIG. 1 from a pre-trained optical character recognition (OCR) model, according to some embodiments.

FIG. 5 is a flowchart for a method 500 for training document reader 106 from a pre-trained OCR model, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1-3. However, method 500 is not limited to that example embodiment.

In 502, document reader 106 initializes a set of weights of encoder 108 with a set of weights of a pre-trained OCR model.

In 504, document reader 106 initializes a set of weights of decoder 110. In some embodiments, document reader 106 initializes a set of weights of attention layer 302, RNN 304, and projection layer 306 with values sampled from a random distribution. Document reader 106 can initialize a different set of weights of decoder 110 using different values as would be appreciated by a person of ordinary skill in the art.

In 506, document reader 106 trains decoder 110 with the weights of encoder 108 being fixed until the performance of decoder 110 increases above a threshold value (e.g., greater than zero). In some embodiments, document reader 106 trains attention layer 302, RNN 304, and projection layer 306 with the weights of encoder 108 being fixed. Document reader 106 can train decoder 110 with the weights of encoder 108 being fixed in various other ways as would be appreciated by a person of ordinary skill in the art.

In 508, document reader 106 trains encoder 108 and decoder 110 until a loss on a validation set stops decreasing. For example, document reader 106 can unfreeze the weights of encoder 108 and train the entire document reader 106. In some embodiments, document reader 106 trains attention layer 302, RNN 304, and projection layer 306 as part of training decoder 110.

Figure 6:
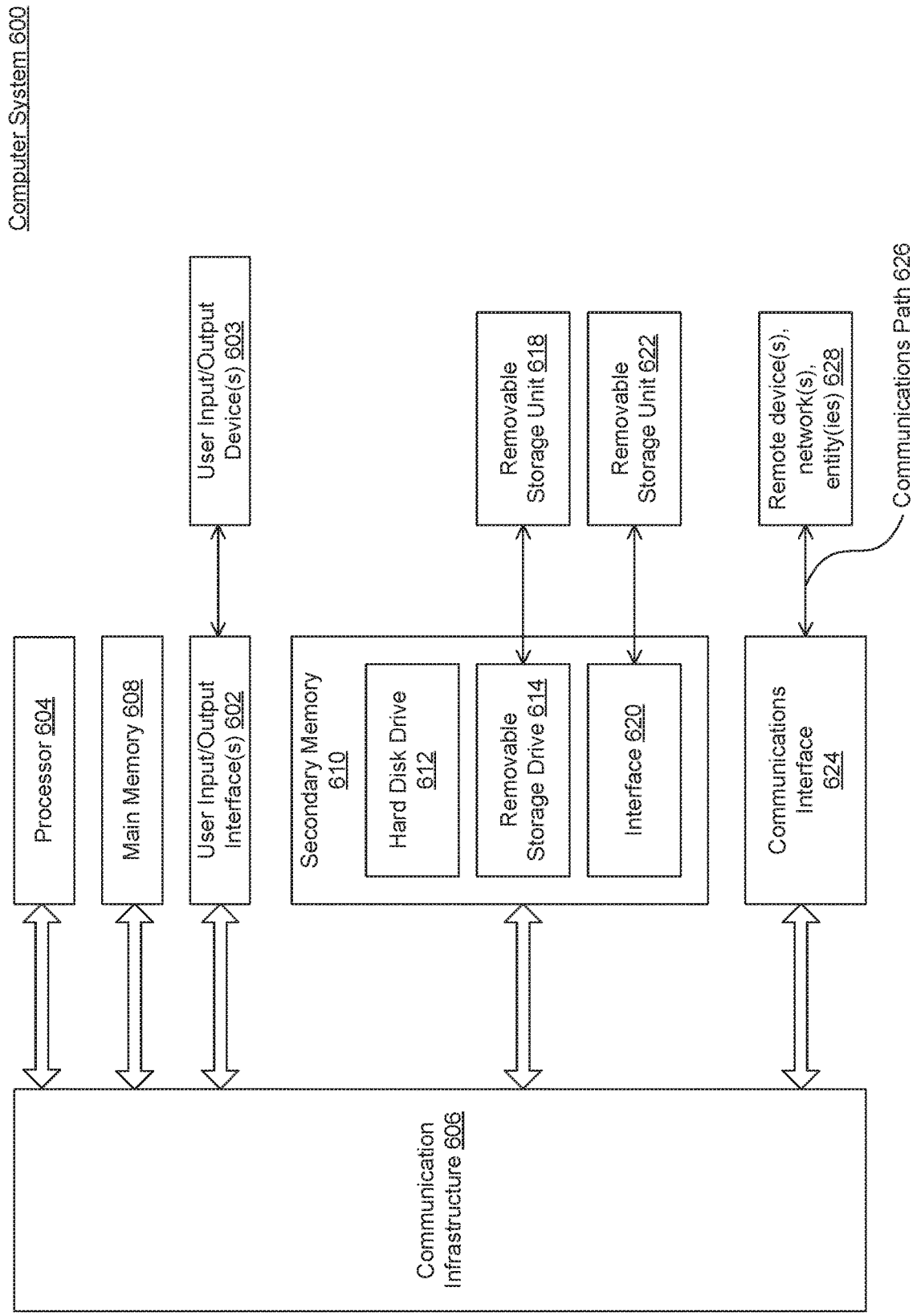
FIG. 6 is an example computer system useful for implementing various embodiments.

Various embodiments can be implemented, for example, using one or more computer systems, such as computer system 600 shown in FIG. 6. Computer system 600 can be used, for example, to implement methods 400 and 500 of FIGS. 4 and 5, respectively. For example, computer system 600 can perform field extraction from a document. Computer system 600 can train a document reader from a pre-trained OCR model, according to some embodiments. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for extracting a field from a document, comprising:
receiving, by at least one processor, the document and a key, wherein the key specifies the field to extract from the document, the key is in textual format, the field is a plurality of characters, and the document is an image representing a plurality of fields;
processing, by a convolutional neural network (CNN) of an encoder, the document, thereby obtaining a feature map;
combining, by the encoder, the feature map with positional information for each feature in the feature map, thereby obtaining a spatial-aware feature map;
processing, using a recurrent neural network (RNN) of a decoder, the spatial-aware feature map and the key, thereby extracting the field in the document corresponding to the key, wherein the processing the spatial-aware feature map and the key comprises:
initializing, a first RNN state associated with the RNN of the decoder, a first set of attention weights for an attention layer, and a first output vector;
generating a second set of attention weights for the attention layer based on the spatial-aware feature map, the key, the first RNN state associated with the RNN, the first set of attention weights for the attention layer, and the first output vector;
generating a context vector based on the spatial-aware feature map and the second set of attention weights using the attention layer;
processing the context vector, the key, and an input vector using the RNN to obtain a second RNN state associated with the RNN;
generating a second output vector based on the second RNN state and the context vector using a projection layer;
storing the second output vector in a list of output vectors;
repeating, until the second output vector corresponds to an end token, the generating the second set of attention weights, the generating the context vector, the processing the context vector, the generating the second output vector, and the storing the second output vector with the second set of attention weights set to a value of the first set of attention weights, the second RNN state set to a value of the first RNN state, the second output vector set to a value of the first output vector, and the second output vector set to a value of the input vector; and extracting only the field from the document based on the list of output vectors, wherein each output vector of the list of output vectors is derived from the key.

2. The method of claim 1, further comprising:
generating the positional information for each feature in the feature map as a set of one-hot vectors.

3. The method of claim 1, further comprising:
generating the positional information for each feature in the feature map as a set of scalar values.

4. The method of claim 1, further comprising:
generating the positional information for each feature in the feature map as a fixed length vector, wherein the fixed length vector is generated by training the attention layer, the RNN, and the projection layer.

5. The method of claim 1, wherein the attention layer is a sum-attention layer, and the RNN is a long short-term memory (LSTM).

6. The method of claim 1, further comprising:
encoding, by the at least one processor, the key using a one-hot vector or a fixed length vector, wherein the fixed length vector is generated by training the attention layer, the RNN, and the projection layer.

7. The method of claim 1, further comprising:
initializing a set of weights of the CNN with a set of weights of a pre-trained optical character recognition (OCR) model;
initializing the RNN and the projection layer with values sampled from a random distribution;
training the attention layer, the RNN, and the projection layer based on the set of weights of the CNN being fixed;
detecting an increase in performance of the attention layer, the RNN, and the projection layer above a threshold value; and
in response to the detecting, training the CNN, the attention layer, the RNN, and the projection layer until a loss on a validation set stops decreasing.

8. A system, comprising:
a memory; and
at least one processor coupled to the memory and configured to:
receive a document and a key, wherein the key specifies a field to extract from the document, the key is in textual format, the field is a plurality of characters, and the document is an image representing a plurality of fields;
process, by a convolutional neural network (CNN) of an encoder, the document, thereby obtaining a feature map;
combine, by the encoder, the feature map with positional information for each feature in the feature map, thereby obtaining a spatial-aware feature map;
process, using a recurrent neural network (RNN) of a decoder, the spatial-aware feature map and the key, thereby extracting the field in the document corresponding to the key, wherein the processing the spatial-aware feature map and the key comprises:

initializing a first RNN state associated with the RNN of the decoder, a first set of attention weights for an attention layer, and a first output vector;
generating a second set of attention weights for the attention layer based on the spatial-aware feature map, the key, the first RNN state associated with the RNN, the first set of attention weights for the attention layer, and the first output vector;
generating a context vector based on the spatial-aware feature map and the second set of attention weights using the attention layer;
processing the context vector, the key, and an input vector using the RNN to obtain a second RNN state associated with the RNN;
generating a second output vector based on the second RNN state and the context vector using a projection layer;
storing the second output vector in a list of output vectors;
repeating, until the second output vector corresponds to an end token, the generate the second set of attention weights, the generate the context vector, the process the context vector, the generate the second output vector, and the store the second output vector with the second set of attention weights set to a value of the first set of attention weights, the second RNN state set to a value of the first RNN state, the second output vector set to a value of the first output vector, and the second output vector set to a value of the input; and
extracting only the field from the document based on the list of output vectors, wherein each output vector of the list of output vectors is derived from the key.

9. The system of claim 8, the at least one processor further configured to:
generate the positional information for each feature in the feature map as a set of one-hot vectors.

10. The system of claim 8, the at least one processor further configured to:
generate the positional information for each feature in the feature map as a set of scalar values.

11. The system of claim 8, the at least one processor further configured to:
generate the positional information for each feature in the feature map as a fixed length vector, wherein the fixed length vector is generated by training the attention layer, the RNN, and the projection layer.

12. The system of claim 8, wherein the attention layer is a sum-attention layer, and the RNN is a long short-term memory (LSTM).

13. The system of claim 8, the at least one processor further configured to:
encode the key using a one-hot vector or a fixed length vector, wherein the fixed length vector is generated by training the attention layer, the RNN, and the projection layer.

14. The system of claim 8, the at least one processor further configured to:
initialize a set of weights of the CNN with a set of weights of a pre-trained optical character recognition (OCR) model;
initialize the RNN and the projection layer with values sampled from a random distribution;
train the attention layer, the RNN, and the projection layer based on the set of weights of the CNN being fixed;

detect an increase in performance of the attention layer, the RNN, and the projection layer above a threshold value; and in response to detection of the increase in performance of the attention layer, train the CNN, the attention layer, the RNN, and the projection layer until a loss on a validation set stops decreasing.

15. A non-transitory computer-readable device having instructions stored thereon that, when executed by at least one computing device, cause the at least one computing device to perform operations comprising:

receiving a document and a key, wherein the key specifies a field to extract from the document, the key is in textual format, the field is a plurality of characters, and the document is an image representing a plurality of fields;

processing, by a convolutional neural network (CNN) of an encoder, the document, thereby obtaining a feature map;

combining, by the encoder, the feature map with positional information for each feature in the feature map, thereby obtaining a spatial-aware feature map;

processing, using a recurrent neural network (RNN) of a decoder, the spatial-aware feature map and the key, thereby extracting the field in the document corresponding to the key, wherein the processing the spatial-aware feature map and the key comprises:

initializing a first RNN state associated with the RNN of the decoder, a first set of attention weights for an attention layer, and a first output vector;

generating a second set of attention weights for the attention layer based on the spatial-aware feature map, the key, the first RNN state associated with the RNN, the first set of attention weights for the attention layer, and the first output vector;

generating a context vector based on the spatial-aware feature map and the second set of attention weights using the attention layer;

processing the context vector, the key, and an input vector using the RNN to obtain a second RNN state associated with the RNN;

generating a second output vector based on the second RNN state and the context vector using a projection layer;

storing the second output vector in a list of output vectors;

repeating, until the second output vector corresponds to an end token, the generating the second set of attention weights, the generating the context vector, the processing the context vector, the generating the second output vector, and the storing the second output vector with the second set of attention weights set to a value of the first set of attention weights, the second RNN state set to a value of the first RNN state, the second output vector set to a value of the first output vector, and the second output vector set to a value of the input vector; and extracting only the field from the document based on the list of output vectors, wherein each output vector of the list of output vectors is derived from the key.

16. The non-transitory computer-readable device of claim 15, the operations further comprising:

generating the positional information for each feature in the feature map as a set of one-hot vectors.

17. The non-transitory computer-readable device of claim 15, the operations further comprising:

generating the positional information for each feature in the feature map as a set of scalar values.

18. The non-transitory computer-readable device of claim 15, the operations further comprising:

generating the positional information for each feature in the feature map as a fixed length vector, wherein the fixed length vector is generated by training the attention layer, the RNN, and the projection layer.

19. The non-transitory computer-readable device of claim 15, wherein the attention layer is a sum-attention layer, and the RNN is a long short-term memory (LSTM).

20. The non-transitory computer-readable device of claim 15, the operations further comprising:

initializing a set of weights of the CNN with a set of weights of a pre-trained optical character recognition (OCR) model;

initializing the RNN and the projection layer with values sampled from a random distribution;

training the attention layer, the RNN, and the projection layer based on the set of weights of the CNN being fixed;

detecting an increase in performance of the attention layer, the RNN, and the projection layer above a threshold value; and in response to the detecting, training the CNN, the attention layer, the RNN, and the projection layer until a loss on a validation set stops decreasing.

* * * * *